J. W. ROBERTS.
AUTOMATIC PIPE CONNECTION.
APPLICATION FILED MAY 8, 1912.
1,062,927.
Patented May 27, 1913.
2 SHEETS—SHEET 2.
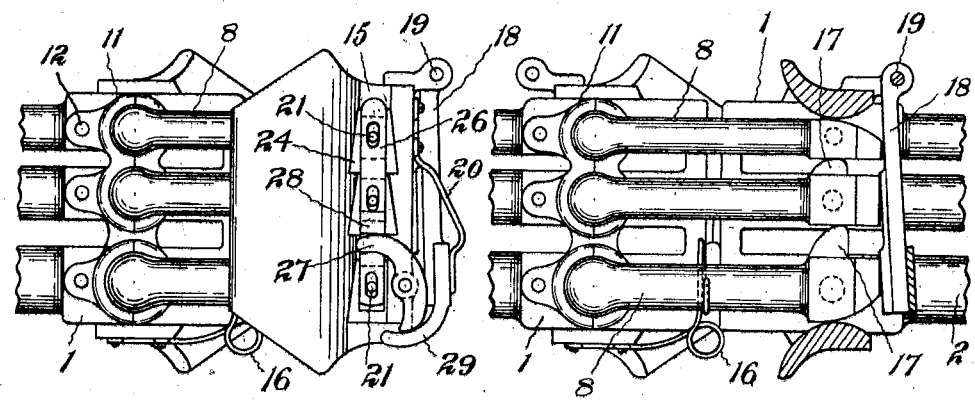
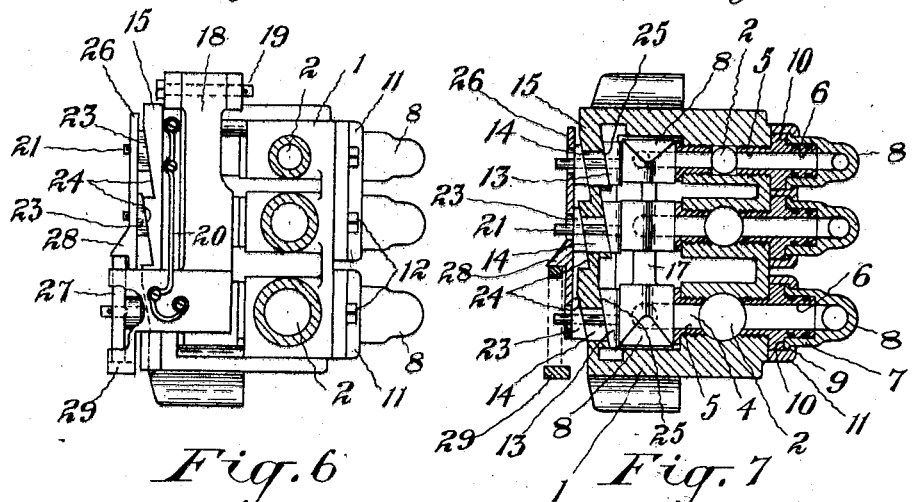
WITNESSES:
H. G. McMillan
E. P. Hall.
INVENTOR.
J. W. Roberts
BY
J. Edward Maybee
ATTORNEY.

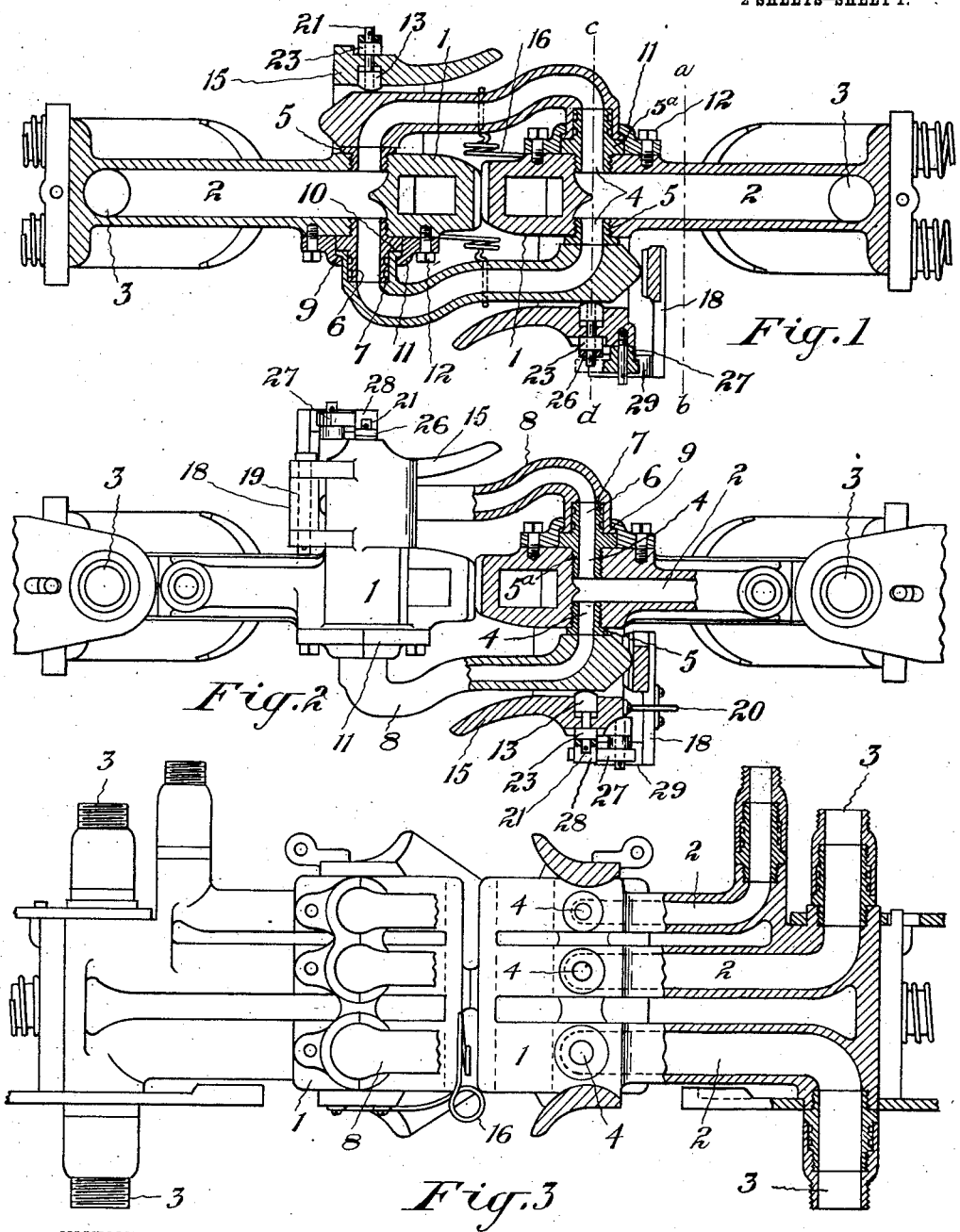

UNITED STATES PATENT OFFICE.

JOHN W. ROBERTS, OF SARNIA, ONTARIO, CANADA.

AUTOMATIC PIPE CONNECTION.

1,062,927.   Specification of Letters Patent.   Patented May 27, 1913.

Application filed May 8, 1912. Serial No. 695,915.

*To all whom it may concern:*

Be it known that I, JOHN W. ROBERTS, of the town of Sarnia, in the Province of Ontario, Canada, have invented certain new and useful Improvements in Automatic Pipe Connections, of which the following is a specification.

This invention relates particularly to means for automatically connecting the air and steam pipes of two adjacent railway cars and my object is to devise connecting means which will simultaneously and automatically couple the steam pipes, air brake train pipe and signal line pipe and maintain a tight joint under all ordinary running conditions.

I attain my object by means of the constructions hereinafter more specifically described and then definitely claimed.

Figure 1 is a longitudinal horizontal section of a pair of coupler heads in engagement. Fig. 2 is a plan view with parts of the coupler heads in section. Fig. 3 is a side elevation of one coupler head partly in section. Fig. 4 is a side elevation of parts of two coupler heads in engagement. Fig. 5 is a similar view partly in section. Fig. 6 is a section on the line $a-b$ in Fig. 1. Fig. 7 is a section on the line $c-d$, Fig. 1.

In the drawings like numerals of reference indicate corresponding parts in the different figures.

1 is a coupler head in which is formed a plurality of fluid passages. These are preferably three in number, the lower being intended particularly for steam, the next above for the train pipe of the air brake system and the upper for the signal line air pipe.

Each fluid passage it will be seen terminates in a rearward opening 3 directed either upwardly or downwardly. This opening 3 will be connected with the appropriate pipe on the car by any suitable flexible connections, such, for example as those shown in my prior Patent No. 1,023,274. As such connections form no part of the present invention they are neither illustrated nor described.

The method of supporting the coupler head also forms no part of the present invention, but in practice I will employ the constructions shown in the prior patent just referred to.

Each passage 2 terminates in the coupler head in two opposite and laterally directed orifices or ports 4. Each of these orifices is provided with a bushing 5 or 5ª preferably of some suitable anti-friction metal screwed therein and provided with a flat, smoothly finished, external face.

Each bushing consists essentially of a cylindrical body portion having a flange 9 which in 5 is at the outer end and in 5ª is intermediate of the ends. One end 6 of the bushing 5ª is adapted to fit within the socket end 7 of a metal coupling pipe 8, so that the latter may turn on said end in a vertical plane. The socket end 7 is provided with the flange 9 adapted to fit against the face 10. A coupling piece 11 preferably made in halves, as seen in Fig. 4, fits over the flange 9 and is secured to the coupler head by means of the screws 12. If the joint between the end 6 and socket 7 be suitably packed a fluid tight joint is formed.

The forward end of each coupling pipe is suitably shaped to engage with the face of the bushing 5 of an opposed coupler head, so as to form a communication with the orifice 4 in which the bushing is inserted.

It is evident that the engaging faces of the coupling pipe and the bushing must be held in close contact if a fluid tight joint is to be maintained. I, therefore, provide means for automatically pressing the said pipes toward the orifices.

Opposite the orifices 4 it will be seen that I locate a plurality of sliding blocks 13, one for each coupling pipe. These blocks slide in a vertical slot 14 formed in the flaring guard 15, which serves to guide the ends of the coupling pipes 8 into place. The ends of these pipes, it will be noted, are curved to engage the sides of the guard to guide them into place. The lower edge of the end of the lower coupling pipe and the upper edge of the end of the upper coupling pipe are also curved, as shown particularly in Fig. 5, to guide the pipes between the flaring upper and lower sides of the guard 15.

The coupling pipes are yieldingly supported in a position to engage the guard by means of the bent spring 16 secured to the coupler head and engaging underneath the lower side of the lower coupling pipe 8. The lower and intermediate coupling pipes are each provided with the projection 17 on which the pipe next above rests, as shown particularly in Fig. 5. Thus all the pipes are yieldingly supported by the said spring.

When the pipes are in the position shown in Fig. 5 they engage the pivoted plate 18 which is pivoted at 19 at the upper part of the coupler head. This plate is preferably stepped, as shown, so that the ends of each pipe will be in engagement with it when it is pushed rearwardly by said pipes from its normal vertical position. See Fig. 5.

The spring 20 is secured at one end to the coupler head and engages with the rear of the plate, as shown in Figs. 2, 4 and 6 tending to maintain it in its normal position. This pivoted plate serves as a medium for permitting the operation of the means for pressing the ends of the coupling pipes toward the orifices or for withdrawing the same from operation.

It will be noted that each of the sliding blocks 13 has a stem 21 formed on or secured thereto, extending through the vertical slot 14. On this stem is secured a wedge-shaped piece 23, the inner face being inclined and the outer face preferably in a vertical plane. The inner faces engage the inwardly and downwardly inclined planes 24 formed on the outside of the guard.

The inner edges of the slot 14 are provided with the inclined planes 25 parallel with the planes 24, the engaging faces of the sliding blocks 13 being similarly shaped. By its own weight each block tends to drop and so wedge the end of the coupling pipe 8 with which it is engaged toward the corresponding orifice.

Normally the blocks 13 are lifted by means of the coupling bar 26 which has slots formed therein through which the stems 21 pass. These slots allow of a certain amount of independent operation of each sliding block 13.

The coupling bar is used to throw the blocks out of operation by means of the bent lever 27 fulcrumed on the outer side of the guard 15. Its upper end engages below the projection 28 on the coupling bar 26 and its lower end is engaged by the curved finger 29 on the pivoted plate 18.

When the plate 18 is pushed rearwardly by contact with the coupling pipes 8 it will be seen that the coupling bar 26 and the sliding blocks 13 will be left free to fall and exercise their wedging action, as already described. Whereas when the couplers are disengaged the coupling bar will be actuated to lift the sliding blocks so that they will not interfere with the free entry of the ends of the coupler pipes within the guard when the coupling is being effected.

By means of the constructions described I am enabled to secure a fluid tight engagement between the coupling pipes and the orifices with which they are engaged. As the pipes may swing vertically differences of height between the two adjacent guards may be compensated for as each pipe will rock independently to accommodate itself to the different level, the ends being accurately guided into place by engagement with the flaring guard 15. Any lateral swing may be provided for by connections such as shown in the prior patent, hereinbefore referred to.

What I claim as my invention is:—

1. In pipe connections the combination of a head; a fluid passage therein terminating in two laterally and oppositely directed orifices; a coupling pipe connected with the head and extending forwardly from one of said orifices and shaped at its forward end to co-act with the free orifice of an opposed head; and a flaring guard at the opposite side of the head from the coupling pipe adapted to guide into place the free end of the coupling pipe of an opposed head and hold it in co-acting relationship with the fluid passage orifice at that side of the head.

2. In pipe connections the combination of a head; a fluid passage therein terminating in two laterally and oppositely directed orifices; a coupling pipe connected with the head and extending forwardly from one of said orifices and shaped at its forward end to co-act with the free orifice of an opposed head; a flaring guard at the opposite side of the head from the coupling pipe adapted to guide into place the free end of the coupling pipe of an opposed head; and movable means tending to press the pipe toward the orifice at that side of the head.

3. In pipe connections the combination of a head; a fluid passage therein terminating in two laterally and oppositely directed orifices; a coupling pipe connected with the head to swing vertically and extending forwardly from one of said orifices and shaped at its forward end to co-act with the free orifice of an opposed head; and a flaring guard at the opposite side of the head from the coupling pipe adapted to guide into place the free end of the coupling pipe of an opposed head and hold it in co-acting relationship with the fluid passage orifice at that side of the head.

4. In pipe connections the combination of a head; a fluid passage therein terminating in two laterally and oppositely directed orifices; a coupling pipe connected with the head and extending forwardly from one of said orifices and shaped at its forward end to co-act with the free orifice of an opposed head; a flaring guard at the opposite side of the head from the coupling pipe adapted to guide into place the free end of the coupling pipe of an opposed head; movable means operable to press the latter pipe toward the orifice at that side of the head; and means operable by the free end of said pipe to cause the operation of said movable means.

5. In pipe connections the combination of a head; a fluid passage therein terminating in two laterally and oppositely directed orifices; a coupling pipe connected with the head and extending forwardly from one of said orifices and shaped at its forward end to co-act with the free orifice of an opposed head; a flaring guard at the opposite side of the head from the coupling pipe adapted to guide into place the free end of the coupling pipe of an opposed head; movable means operable to press the latter pipe toward the orifice at that side of the head; means operable by the free end of said pipe to cause the operation of said movable means; and spring means tending to maintain the movable means in normal position.

6. In pipe connections the combination of a head; a fluid passage therein terminating in two laterally and oppositely directed orifices; a coupling pipe connected with the head and extending forwardly from one of said orifices and shaped at its forward end to co-act with the free orifices of an opposed head; a flaring guard at the opposite side of the head from the coupling pipe adapted to guide into place the free end of the coupling pipe of an opposed head and hold it in co-acting relationship with the fluid passage orifice at that side of the head; and a spring support for said coupling pipe.

7. In pipe connections the combination of a head; a plurality of fluid passages therein each terminating in two laterally and oppositely directed orifices; a plurality of coupling pipes connected with the head to swing vertically and each extending forwardly from one of said orifices at one side of the head; and spring means adapted to support said pipes.

Sarnia, Ont. this 1st day of May 1912.

JOHN W. ROBERTS.

Signed in the presence of—
CLARE JUDGE,
NORMAN GOOD.

---

Copies of this patent may be obtained for five cents each, by addressing the "Commissioner of Patents, Washington, D. C."